US012493971B2

(12) United States Patent
Baruch et al.

(10) Patent No.: US 12,493,971 B2
(45) Date of Patent: Dec. 9, 2025

(54) MATERIAL SEGMENTATION

(71) Applicant: TAKE-TWO INTERACTIVE SOFTWARE, INC., New York, NY (US)

(72) Inventors: Yair Baruch, Tel Aviv (IL); Vsevolod Kagarlitsky, Ramat Gan (IL); Shirley Keinan, Tel Aviv (IL); Amir Green, Mitzpe Netofa (IL); Yigal Eilam, Kiryat Ono (IL); Matan Efrima, Tel Aviv (IL); Michael Birnboim, Holon (IL); Gilad Talmon, Tel Aviv (IL)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 273 days.

(21) Appl. No.: 18/104,543

(22) Filed: Feb. 1, 2023

(65) Prior Publication Data
US 2023/0252657 A1    Aug. 10, 2023

Related U.S. Application Data

(60) Provisional application No. 63/307,130, filed on Feb. 6, 2022.

(51) Int. Cl.
*G06T 7/40*    (2017.01)
*G06V 10/54*    (2022.01)
(Continued)

(52) U.S. Cl.
CPC .............. *G06T 7/40* (2013.01); *G06V 10/54* (2022.01); *G06V 10/60* (2022.01); *G06V 10/761* (2022.01);
(Continued)

(58) Field of Classification Search
CPC . G06T 7/40; G06T 2207/10024; G06V 10/54; G06V 10/60; G06V 10/761;
(Continued)

(56) References Cited

U.S. PATENT DOCUMENTS 5,886,706 A * 3/1999 Alcorn .................... G06T 15/04
                                            345/506
7,245,302 B1 * 7/2007 Donham .................. G06T 1/20
                                            345/522
(Continued)

FOREIGN PATENT DOCUMENTS

WO    2019229293 A1    12/2019
WO    2020254720 A1    12/2020
WO    2021211173 A1    10/2021

OTHER PUBLICATIONS

PCT International Search Report for International Application No. PCT/IL2023/050111, mailed May 24, 2023, 6pp.
(Continued)

*Primary Examiner* — Kathleen Y Dulaney
(74) *Attorney, Agent, or Firm* — Orrick, Herrington & Sutcliffe LLP

(57) ABSTRACT

A method for generating metadata to accompany a volumetric video for texels in an object in a volumetric video. The method comprises steps of: inputting a 2D representation of the object; identifying areas in the representation that have the same one or more properties with respect to light; and generating input material groups, where all texels in each input material group have the same properties with respect to light. There exists a correspondence between at least part of the input representation and at least part of the object in the volumetric video, so that there is a correspondence between texels in the representation and texels in the object so that output material groups can be generated from the
(Continued)

input material groups and the properties with respect to light can be stored with the volumetric video as metadata.

14 Claims, 10 Drawing Sheets

(51) Int. Cl.
 *G06V 10/60* (2022.01)
 *G06V 10/74* (2022.01)
 *G06V 20/40* (2022.01)
 *H04N 13/388* (2018.01)

(52) U.S. Cl.
 CPC ........... *G06V 20/46* (2022.01); *H04N 13/388* (2018.05); *G06T 2207/10024* (2013.01)

(58) Field of Classification Search
 CPC ........ G06V 20/46; G06V 10/26; G06V 20/40; H04N 13/388; G06F 18/22
 USPC .................. 382/108, 173, 195; 345/426, 582
 See application file for complete search history.

(56) References Cited

U.S. PATENT DOCUMENTS

| | | | | |
|---|---|---|---|---|
| 8,134,566 | B1* | 3/2012 | Brown | G06T 15/04 345/522 |
| 2004/0227766 | A1* | 11/2004 | Chou | G06T 15/04 345/582 |
| 2008/0259081 | A1* | 10/2008 | Bunnell | G06T 13/00 345/426 |
| 2012/0148162 | A1* | 6/2012 | Zhang | G06T 7/11 382/195 |
| 2017/0358119 | A1* | 12/2017 | Forutanpour | G06T 11/001 |
| 2019/0251734 | A1* | 8/2019 | Li | H04N 13/161 |
| 2020/0134911 | A1* | 4/2020 | van Hoff | G06T 7/292 |
| 2020/0312008 | A1* | 10/2020 | Cowburn | G06V 30/274 |
| 2020/0336745 | A1* | 10/2020 | Zhao | H04N 19/137 |
| 2020/0372603 | A1* | 11/2020 | Rangan | G06T 15/04 |
| 2022/0343592 | A1* | 10/2022 | Delgado | G06T 15/04 |
| 2022/0366633 | A1* | 11/2022 | Alfieri | G06T 15/06 |
| 2023/0141395 | A1* | 5/2023 | Perroni-Scharf | G06T 15/04 382/100 |
| 2023/0169715 | A1* | 6/2023 | Lakshminarayana | G06T 11/001 |

OTHER PUBLICATIONS

PCT Written Opinion for International Application No. PCT/IL2023/050111, mailed May 24, 2023, 5pp.

* cited by examiner

MATERIAL SEGMENTATION

CROSS REFERENCE TO RELATED APPLICATIONS

This application claims the benefit of priority of U.S. Provisional Patent Application No. 63/307,130, filed Feb. 6, 2022, the contents of which are all incorporated herein by reference in their entirety.

FIELD OF THE INVENTION

The present invention generally pertains to a system and method for texturing a volumetric video, so that light can be reflected from the textured surfaces in a realistic manner.

BACKGROUND OF THE INVENTION

When viewing volumetric video, perceived quality is significantly increased when the volumetric video is rendered with respect to the light properties of the scene.

For example, if a red light source is illuminating an object, the surface will have a stronger red tint in the areas that are directly illuminated by the light source and weaker red tint (or none at all) in areas that are either indirectly illuminated by the red source or are in its shadow.

To illustrate, a disco typically contains light sources of different colors at different locations so that a person, say a woman, in a disco can be illuminated by different colors coming from different directions. The upper part of her body could, for example, be illuminated by a source that alternates between red and blue, with the light coming from the direction she is facing when she steps onto the dance floor. Light coming from overhead could be green. Light coming from her right (when she steps onto the floor) could be purple alternating with yellow, while light from the left could be orange, flashing on and off. Adding further complexity, as she dances, her position changes with respect to the sources, both in distance and angle (horizontal and vertical). The positions and angles of her body parts also change, with the changes in position and angle of the various body parts being different from each other.

In order to make a fully realistic VR or AR scene, the interaction of the virtual light sources with the virtual objects, in the above example, the woman and her clothing, needs to be modeled Since different materials respond differently to light it is essential to differentiate between the types of materials the volumetric video, for example, reflective materials such as metals behave very differently than human skin. Much more light will be reflected from a metal surface than from skin or a fabric surface and the reflection from the metal will be much more specular. In addition, a bald head will reflect more light than a bare hand.

It is therefore a long felt need to provide a means and method for providing texture information on response to light for volumetric video.

SUMMARY OF THE INVENTION

It is an object of the present invention to disclose a system for texturing a volumetric video, so that light can be reflected from the textured surfaces in a realistic manner.

It is another object of the present invention to disclose a method for generating metadata to accompany a volumetric video for at least one output texel of at least one object in at least one frame of a volumetric video, comprising steps of:

inputting at least one representation of said at least a portion of at least one object, wherein said representation is selected from a group consisting of a 2D image from an imaging device, a 2D image from a rendered frame of a volumetric video, a patch, a point cloud that helped build a volumetric video, a point cloud that is a sampling of a volumetric video, a portion of a mesh, or any combination thereof;

identifying, in said at least one representation, at least one matching material area, each of said at least one matching material area comprising at least one input texel, all of said at least one matching material area having the same one or more properties with respect to light;

generating at least one input material group, all of said at least one input texel in each of said at least one input material group having the same one or more properties with respect to light; each of said at least one input material group comprising all of said at least one input texel from all of said at least one matching material area;

for at least one of said at least one input material group there exists a correspondence with an output material group, each of said output material group comprising at least one of said at least one output texel;

wherein all of said at least one output texel in each of said output material group has the same one or more properties with respect to light;

wherein said metadata is associated with said one or more properties with respect to light.

It is another object of the present invention to disclose the method as described in any of the above, additionally comprising a step of assigning to each of said at least one output material group a material group descriptor selected from a group consisting of a material index, said one or more properties with respect to light or any combination thereof.

It is another object of the present invention to disclose the method as described in any of the above, additionally comprising a step of encoding said material group descriptor in a member of a group consisting of an atlas, a file or any combination thereof.

It is another object of the present invention to disclose the method as described in any of the above, additionally comprising a step of rendering said at least one output texel of said at least one object in at least one frame of a volumetric video, said rendering comprising rendering of light, said rendering of light dependent on said one or more properties with respect to light of said at least one output texel of said at least one object in at least one frame of a volumetric video.

It is another object of the present invention to disclose the method as described in any of the above, additionally comprising a step of selecting said behavior with respect to light from a group consisting of a color, a roughness, a metalness, normal direction, texture, or any combination thereof.

It is another object of the present invention to disclose the method as described in any of the above, additionally comprising a step of, for an occluded texel, where an occluded texel is one of said at least one output texel associated with none of said material group descriptor, determining an occluded material group descriptor for said occluded texel by using metadata from at least one neighboring output texel.

It is another object of the present invention to disclose the method as described in any of the above, additionally comprising a step of, for said occluded texel being associated with a plurality of said material group descriptor, reducing said plurality of material group descriptors to a single material group descriptor.

It is another object of the present invention to disclose the method as described in any of the above, additionally comprising a step of said reducing of said plurality of material group descriptors to a single material group descriptor being by means of a decision algorithm.

It is another object of the present invention to disclose the method as described in any of the above, additionally comprising a step of selecting said decision algorithm from a group consisting of a voting based algorithm, a decision tree based algorithm, or a deep learning classification based algorithm.

It is another object of the present invention to disclose the method as described in any of the above, additionally comprising a step of selecting said at least one frame to be a plurality of frames.

It is another object of the present invention to disclose the method as described in any of the above, additionally comprising a step of selecting a representative frame from said plurality of frames.

It is another object of the present invention to disclose the method as described in any of the above, additionally comprising a step of encoding said material group descriptor once for said plurality of frames.

It is another object of the present invention to disclose the method as described in any of the above, additionally comprising steps of selecting a subset of a group of frames; of determining, for each frame of said subset of said group of frames, a set of material group descriptors; and, for each of said at least one output texel, determining a single material group descriptor by means of a decision algorithm.

It is another object of the present invention to disclose the method as described in any of the above, additionally comprising a step of selecting said decision algorithm from a group consisting of a voting based algorithm, a decision tree based algorithm, or a deep learning classification based algorithm.

It is another object of the present invention to disclose the method as described in any of the above, additionally comprising a step of determining a material group descriptor for each of said at least one output texel in each of said plurality of frames, said determining being executed independently for each frame in said plurality of frames.

It is another object of the present invention to disclose the method as described in any of the above, additionally comprising a step of determining a relationship between said at least one output texel and said material group descriptor in each of said plurality of images, said relationship selected from a group consisting of one-to-none, one-to-one and one-to-many.

It is another object of the present invention to disclose the method as described in any of the above, additionally comprising a step of, for the relationship between said at least one output texel and said material group descriptor in each of said plurality of images being one-to-many, reducing a plurality of material group descriptors to a single material group descriptor for said at least one output texel.

It is another object of the present invention to disclose the method as described in any of the above, additionally comprising a step of said reducing of said plurality of material group descriptors to a single material group descriptor being by means of a decision algorithm.

It is another object of the present invention to disclose the method as described in any of the above, additionally comprising a step of selecting said decision algorithm from a group consisting of a voting based algorithm, a decision tree based algorithm, or a deep learning classification based algorithm.

It is another object of the present invention to disclose the method as described in any of the above, for each of said one-to-none output texel, said one-to-none output texel does not have a relationship with any of said material group descriptor, additionally comprising a step selected from a group consisting of:
  a. selecting at least one second representative frame from said plurality of frames and determining, from said at least one second representative frame, a material group descriptor for at least one of said one-to-none output texel;
  b. determining said material group descriptor for at least one of said one-to-none output texel by using metadata from at least one neighboring output texel; and
  c. selecting at least one second representative frame from said plurality of frames and determining, from said at least one second representative frame, a material group descriptor for at least one of said one-to-none output texel and determining said material group descriptor for at least one of said one-to-none texel by using metadata from at least one neighboring output texel.

It is another object of the present invention to disclose the method as described in any of the above, additionally comprising a step of, for each of said one-to-none texel having a plurality of material descriptors, reducing said plurality of material descriptors to a single material group descriptor.

It is another object of the present invention to disclose the method as described in any of the above, additionally comprising a step of said reducing of said plurality of material group descriptors to a single material group descriptor being by means of a decision algorithm.

It is another object of the present invention to disclose the method as described in any of the above additionally comprising a step of selecting said decision algorithm from a group consisting of a voting based algorithm, a decision tree based algorithm, or a deep learning classification based algorithm.

It is another object of the present invention to disclose the method as described in any of the above, additionally comprising a step of determining a first output texel to be a border texel, said first output texel having a first material group descriptor and a second output texel having a second material group descriptor; said second material group descriptor being different from said first material group descriptor and said first output texel being within a predetermined range of said second output texel.

It is another object of the present invention to disclose the method as described in any of the above, additionally comprising a step of encoding, for each of said border texel, said first material group descriptor and said second material group descriptor.

It is another object of the present invention to disclose an executable package configured, when executed, to generate metadata to accompany a volumetric video for at least one output texel of at least one object in at least one frame of a volumetric video, comprising software configured to:
  input at least one representation of said at least a portion of at least one object, wherein said representation is selected from a group consisting of a 2D image from an imaging device, a 2D image from a rendered frame of a volumetric video, a patch, a point cloud that helped build a volumetric video, a point cloud that is a sampling of a volumetric video, a portion of a mesh, or any combination thereof;

identify, in said at least one representation, at least one matching material area, each of said at least one matching material area comprising at least one input texel, all of said at least one matching material area having the same one or more properties with respect to light;

generate at least one input material group, all of said at least one input texel in each of said at least one input material group having the same one or more properties with respect to light; each of said at least one input material group comprising all of said at least one input texel from all of said at least one matching material area;

for at least one of said at least one input material group there exists a correspondence with an output material group, each of said output material group comprising at least one of said at least one output texel;

wherein all of said at least one output texel in each of said output material group has the same one or more properties with respect to light;

wherein said metadata is associated with said one or more properties with respect to light.

It is another object of the present invention to disclose the executable package as described in any of the above, wherein to each of said at least one output material group is assigned a material group descriptor selected from a group consisting of a material index, said one or more properties with respect to light or any combination thereof.

It is another object of the present invention to disclose the executable package as described in any of the above, wherein said material group descriptor is encoded in a member of a group consisting of an atlas, a file or any combination thereof.

It is another object of the present invention to disclose the executable package as described in any of the above, wherein said at least one output texel of said at least one object in at least one frame of a volumetric video is rendered, said rendering comprising rendering of light, said rendering of light dependent on said one or more properties with respect to light of said at least one output texel of said at least one object in at least one frame of a volumetric video.

It is another object of the present invention to disclose the executable package as described in any of the above, wherein said behavior with respect to light is selected from a group consisting of a color, a roughness, a metalness, normal direction, texture, or any combination thereof.

It is another object of the present invention to disclose the executable package as described in any of the above, wherein, for an occluded texel, where an occluded texel is one of said at least one output texel associated with none of said material group descriptor, an occluded material group descriptor is determined for said occluded texel by using metadata from at least one neighboring output texel.

It is another object of the present invention to disclose the executable package as described in any of the above wherein, for said occluded texel being associated with a plurality of said material group descriptor, said plurality of material group descriptors is reduced to a single material group descriptor.

It is another object of the present invention to disclose the executable package as described in any of the above, wherein said plurality of material group descriptors is reduced to a single material group descriptor by means of a decision algorithm.

It is another object of the present invention to disclose the executable package as described in any of the above, wherein said decision algorithm is selected from a group consisting of a voting based algorithm, a decision tree based algorithm, or a deep learning classification based algorithm.

It is another object of the present invention to disclose the executable package as described in any of the above, wherein said at least one frame is a plurality of frames.

It is another object of the present invention to disclose the executable package as described in any of the above, wherein a representative frame is selected from said plurality of frames.

It is another object of the present invention to disclose the executable package as described in any of the above, wherein said material group descriptor is encoded once for said plurality of frames.

It is another object of the present invention to disclose the executable package as described in any of the above, wherein a subset of a group of frames is selected; for each frame of said subset of said group of frames, a set of material group descriptors is determined; and, for each of said at least one output texel, a single material group descriptor is determined by means of a decision algorithm.

It is another object of the present invention to disclose the executable package as described in any of the above, wherein said decision algorithm is selected from a group consisting of a voting based algorithm, a decision tree based algorithm, or a deep learning classification based algorithm.

It is another object of the present invention to disclose the executable package as described in any of the above, wherein a material group descriptor is determined for each of said at least one output texel in each of said plurality of frames, the determination being executed independently for each frame in said plurality of frames.

It is another object of the present invention to disclose the executable package as described in any of the above, wherein a relationship is determined between said at least one output texel and said material group descriptor in each of said plurality of images, said relationship selected from a group consisting of one-to-none, one-to-one and one-to-many.

It is another object of the present invention to disclose the executable package as described in any of the above, wherein, for the relationship between said at least one output texel and said material group descriptor in each of said plurality of images being one-to-many, a plurality of material group descriptors is reduced to a single material group descriptor for said at least one output texel.

It is another object of the present invention to disclose the executable package as described in any of the above, wherein said plurality of material group descriptors to a single material group descriptor is reduced to a single material group descriptor by means of a decision algorithm.

It is another object of the present invention to disclose the executable package as described in any of the above, wherein said decision algorithm is selected from a group consisting of a voting based algorithm, a decision tree based algorithm, or a deep learning classification based algorithm.

It is another object of the present invention to disclose the executable package as described in any of the above, wherein, for each one-to-none output texel, said one-to-none output texel does not have a relationship with any of said material group descriptor, an additional instruction is selected from a group consisting of:

a. select at least one second representative frame from said plurality of frames and determine, from said at least one second representative frame, a material group descriptor for said one-to-none output texel;
b. determine said material group descriptor for said one-to-none output texel by using metadata from at least one neighboring output texel; and
c. select at least one second representative frame from said plurality of frames and determine, from said at least one second representative frame, a material group descriptor for said one-to-none output texel and determine said material group descriptor for said one-to-none texel by using metadata from at least one neighboring output texel.

It is another object of the present invention to disclose the executable package as described in any of the above, wherein, for each of said one-to-none texel having a plurality of material group descriptors, said plurality of material group descriptors is reduced to a single material group descriptor.

It is another object of the present invention to disclose the executable package as described in any of the above, wherein said plurality of material group descriptors is reduced to a single material group descriptor by means of a decision algorithm.

It is another object of the present invention to disclose the executable package as described in any of the above, wherein said decision algorithm is selected from a group consisting of a voting based algorithm, a decision tree based algorithm, or a deep learning classification based algorithm.

It is another object of the present invention to disclose the executable package as described in any of the above, wherein a first output texel is determined to be a border texel for said first output texel having a first material group descriptor and a second output texel having a second material group descriptor, said second material group descriptor being different from said first material group descriptor and said first output texel being within a predetermined range of said second output texel.

It is another object of the present invention to disclose the executable package as described in any of the above, wherein, for each of said border texel, said first material group descriptor and said second material group descriptor are encoded.

BRIEF DESCRIPTION OF THE FIGURES

In order to better understand the invention and its implementation in practice, a plurality of embodiments will now be described, by way of non-limiting example only, with reference to the accompanying drawings, wherein.

DETAILED DESCRIPTION OF THE PREFERRED EMBODIMENTS

Figure 1:
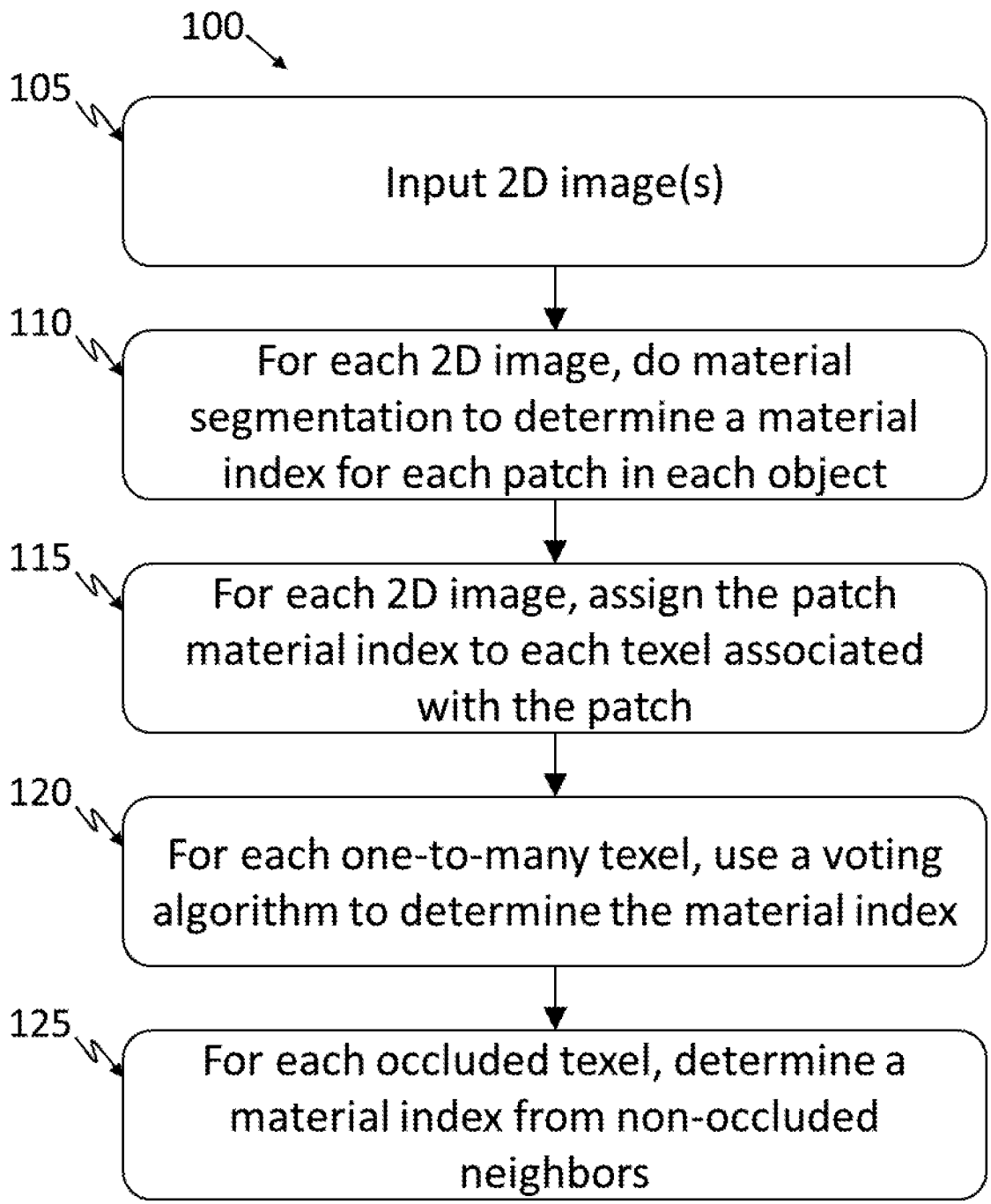
FIGS. 1-5 illustrate embodiments of flow charts depicting methods of determining material indexes.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for texturing a volumetric video, so that light can be reflected from the textured surfaces in a realistic manner.

The term 'model' hereinafter refers to a representation of an object as generated by software at a given point in time. For non-limiting example, as used herein, a person constitutes an object. The person, as captured in a video image, also constitutes an object. The person, as input into software and, therefore, manipulatable, constitutes a model.

The term 'surface' hereinafter refers to the totality of the outermost part of a model. For on-limiting example, a person's skin defines the surface of a naked person.

The term 'input texel' hereinafter refers to the smallest unit defining the surface of an inputtable object and its texture. Non-limiting examples of input texels are: a pixel and its texture if the input is an image, a point and its texture if the input is cloud of points, a pixel and its texture in an atlas if the input is a mesh, a triangle (or other polygon) and its texture if the input is a mesh, or a vertex of a triangle (or other polygon) and its texture if the input is a mesh.

The term 'output texel' hereinafter refers to the smallest unit renderable in a volumetric video or 3D model and its texture. Typically, an output texel is the part of the surface of a model that is mapped to a single pixel in the atlas by the uv map.

The term 'texel' hereinafter refers to the smallest unit defining the surface of an object and its texture.

The term 'material index' hereinafter refers to an identifier linking items that have the same set of properties with respect to light. The item can be, for non-limiting example, a patch, an area, a texel, an input texel or an output texel. Note that, herein, any type of identifier will be referred to as a material index; the material index need not be a letter or number.

When viewing volumetric video, perceived quality is significantly increased when the volumetric video is rendered with respect to the light properties of the scene.

For example, if a red light source is illuminating an object, the surface will have a stronger red tint in the areas that are directly illuminated by the light source and a weaker red tint (or none at all) in areas that are either indirectly illuminated by the red source or are in its shadow.

In the case of volumetric video that is rendered inside a virtual reality (VR) environment, light comes from computer graphics (CG) light emitters; the light sources are simulated within the software generating the scene. In the case of volumetric video that is rendered inside an augmented reality (AR) environment, light can come from either CG light emitters or from detecting and modeling the light in the scene that the volumetric video is played in.

In either case, the software must be able to determine the textural characteristics of each surface unit of the model(s) in the video.

The general process is:
1. Detect the material(s) in the surface(s).
2. Assign "light properties" properties to each material.
3. For each material, ensure that the renderer can associate the light properties to the material during rendering. A non-limiting example of such an association comprises providing the renderer with material indexes associated with the surfaces; the renderer can then assign the light properties to the materials by code in the shader. In another non-limiting example, the light properties are detected "on the fly" and are not stored.

4. Render the result according to the light properties.

Detect the Materials in the Surface

The material segmentation process determines an index that represents the material and assigns that index to each texel comprising that material; texels with the same index belong to the same material.

In some cases, "over segmentation" occurs. For example, the face and the hand can receive different indexes although they belong to the same material. This is not a problem since a plurality of indexes can be united into a single index, typically during material segmentation, two or more indexes can have identical lighting properties, or both index unification and multiple indexes with the same lighting properties can occur.

Note that the material index describes the material. The segmentation process divides the object(s) into patches, with each patch comprising one material, and assigns a material index to each material. After segmentation, conceptually, the surface of the object(s) has been divided into patches, with each patch having a descriptor, the material index. The properties (metallicity, reflectivity, etc.) of the patch have not yet been determined.

Non-limiting exemplary embodiments of methods to assign a material index or other descriptor to an output texel are given below. The material descriptor that is encoded in association with the output texel can be a material index, one or more properties with respect to light or any combination thereof.

Single Frame 2D Approach

An exemplary method for a single-frame 2D approach (100) is given in FIG. 1. In the exemplary method, the steps comprise:

1. Provide at least one 2D image (105). A 2D image can be a still camera image, a camera image from which a volumetric video was generated, it can be a 2D rendering of a volumetric model at some angle or any combination thereof. The angle need not be an angle where an input camera existed.

2. Apply a 2D network that does material segmentation and classification (110) to each 2D image and generate a material index (or other identifier) for each visible patch of each object of interest in each 2D image, where all patches with the same material index have the same set of properties with respect to light. Many types of 2D networks that do material segmentation and classification could be used. One exemplary technique is Graphonomy. Other exemplary techniques include, but are not limited to, pulse-coupled neural networks (PCNNs), convolutional neural networks, long short-term memory (LSTM) models, and multi-task learning. Exemplary 2D network segmentation and classification software packages include, but are not limited to, DeepLab and RefineNet. The essence of the invention is not limited by the 2D network used.

Note that, herein, any type of identifier will be referred to as a material index; the material index need not be a letter, a numeral or a combination thereof.

3. Apply the material indexes (115) for each patch in each image to the output texel(s) that correspond to the patch(es). An output texel can have a one-to-none relationship with the input (the portion of the patch corresponding to the output texel is occluded in all images), it can have a one-to-one relationship with the input (the portion of the patch corresponding to the output texel is visible in only one image or all portions of the patch(es) corresponding to the output texel have identical material indexes) or it can have a one-to-many relationship with the input (the portions of the patch(es) corresponding to the output texel have different material indexes).

4. For texels that have a one-to-many relationship with the input, the plurality of material indexes must be reduced to a single index (120), typically by means of a decision algorithm. Some non-limiting examples of a decision algorithms are a voting based algorithm, a decision tree based algorithm, or a deep learning classification based algorithm.

For any area that is completely occluded (not visible in any of the input images), a material index can be determined (125) for texels corresponding to that area (occluded texels) by using data from neighboring texels with similar colors, where a neighboring texel is within a predetermined distance or a predetermined number of texels of a boundary between visible and occluded texels. If neighboring texel(s) have similar but not identical colors, an index can be generated for the occluded texel(s) from the indexes of the neighboring texels by a decision algorithm, as disclosed above.

In some cases one set of neighboring texels has a first color (a first set of similar colors) and another set of neighboring texels has a second color (a second set of similar colors), with the first color different from the second color. For non-limiting example, the first color could be in a pair of blue pants, while the second color could be the yellow in a shirt. In this case, an index can be generated for the occluded texel(s) from the indexes of the neighboring texels by a decision algorithm, as disclosed above, the decision algorithm configured (or trained) to determine a boundary between the two colors so that one color is applied to the texels on one side of the boundary and the other color is applied to texels on the other side of the boundary.

The determination of a material index for an occluded texel can be made at either the input texel stage or the output texel stage. More commonly, determination of material index for an occluded texel is done at the input texel stage.

Single Frame 3D Approach

Figure 2:
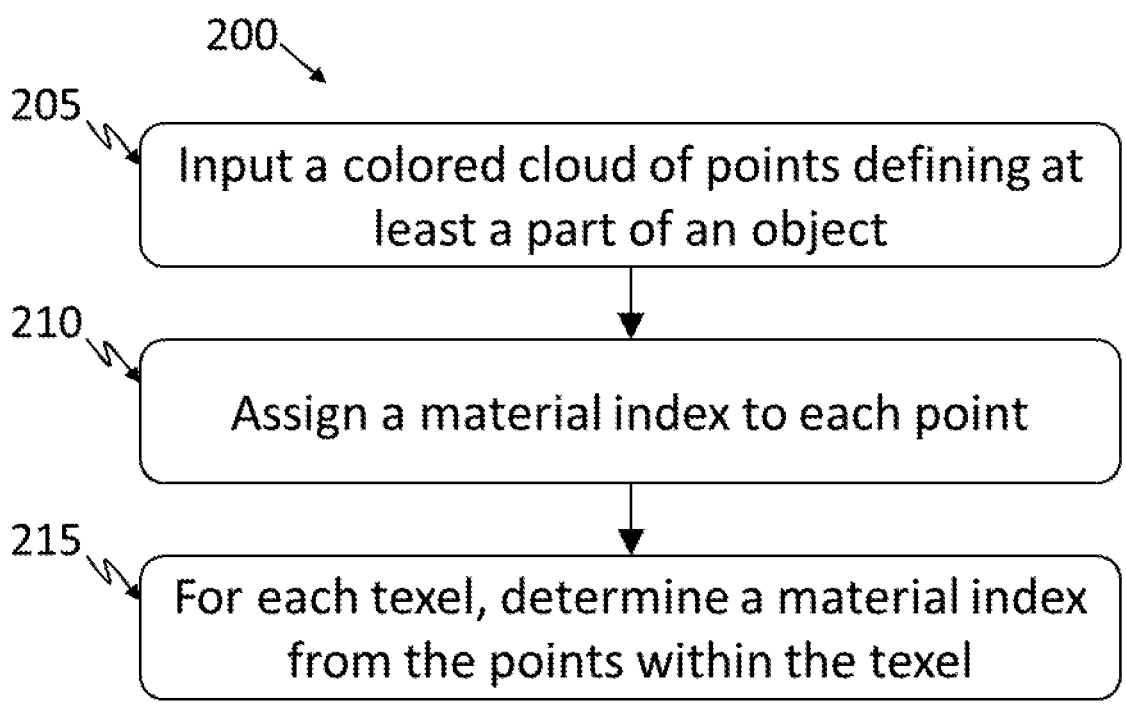

An exemplary method for a single-frame 3D approach (200) is given in FIG. 2.

1. Provide a model (205) of at least a part of at least one object, the model comprising a cloud of points that define its surface, with each point in the cloud having a color. The input to the neural network can be any subset of the cloud of points used to create the volumetric video, any subset of the triangle vertices (or other polygon vertices) that compose the volumetric video frame, any sampling of the volumetric video or any combination thereof.

2. Use a neural network (such as, but not limited to, PointNet++) that works on a colored cloud of points to assign a material index to each point (210). Other techniques include, but are not limited to, volumetric convolutional neural networks (CNNs), Multiview CNNs, Spectral CNNs, and Feature-based deep neural networks (DNNs). The essence of the invention is not limited by the 2D network used.

3. Use the points to assign a material index (215) to each texel. Any conventional method, such as, but not limited to, the decision algorithm method disclosed above, can be used to generate a single material index from the material indexes of the points within the texel.

Combined 2D and 3D Approach

The 2D method and the 3D method can be combined. For example, the material indexes found using the 3D method can participate in the decision algorithm of the 2D method.

Figure 3:
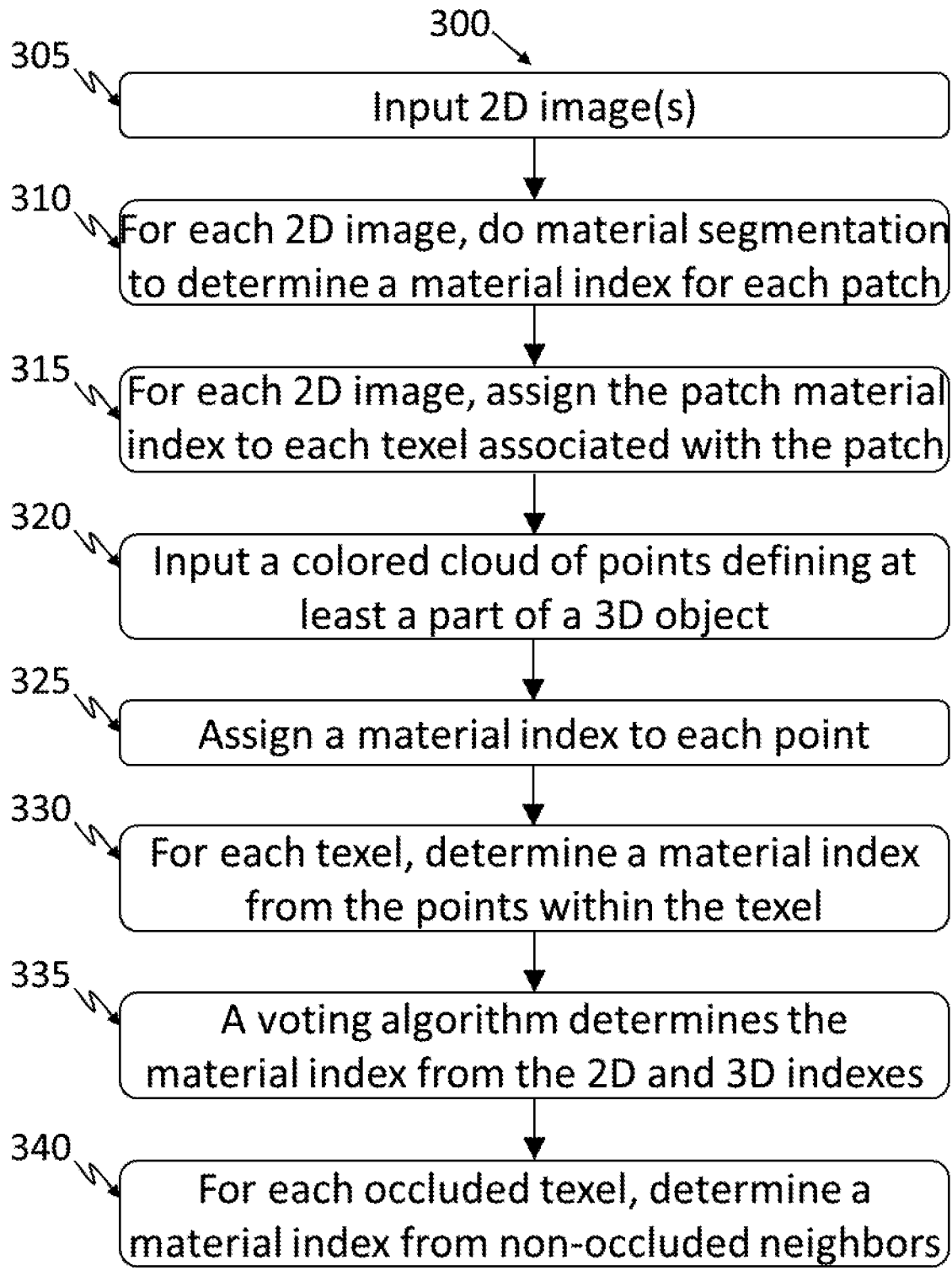
Figure 4:
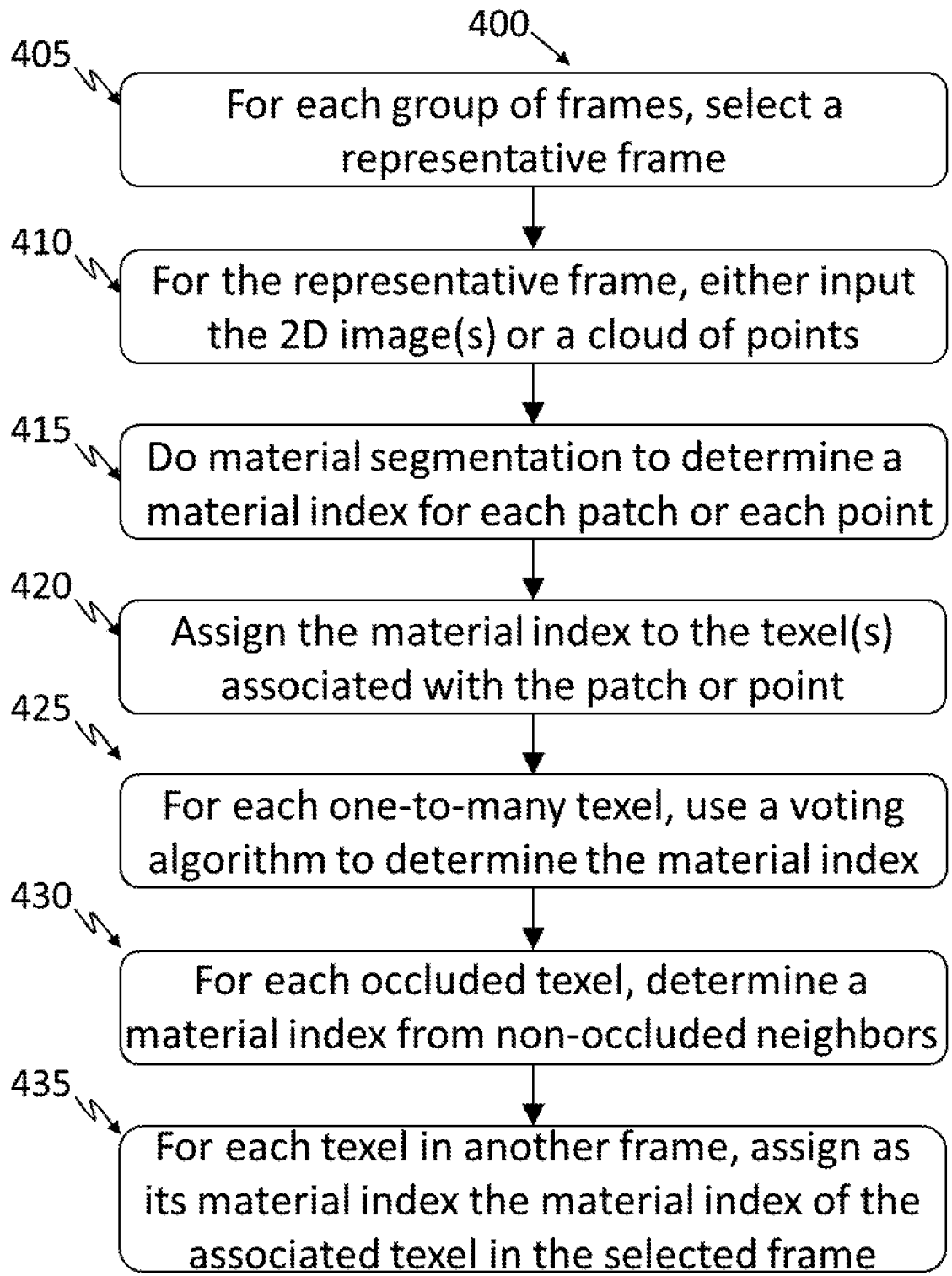
Figure 5:
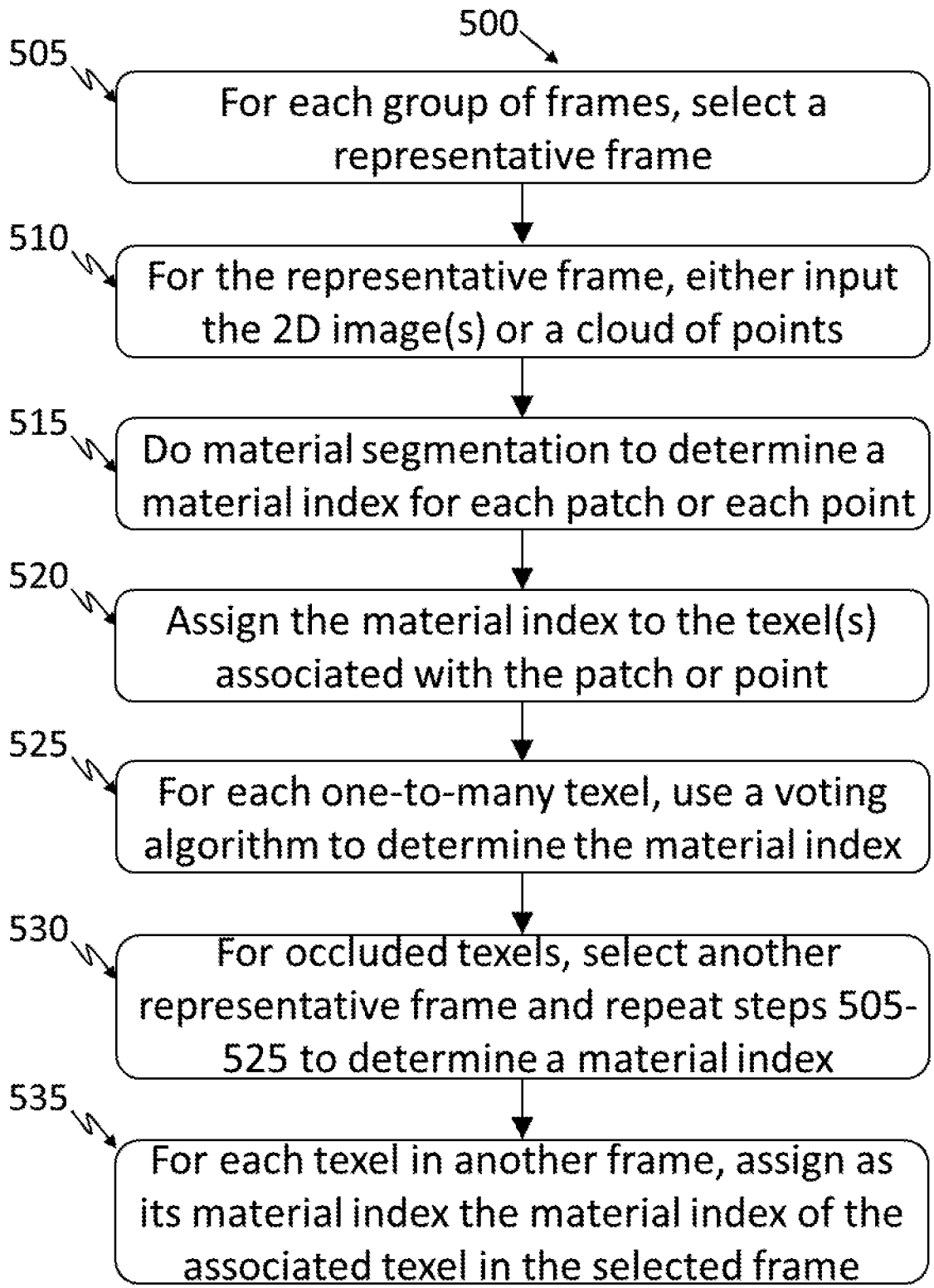

An exemplary embodiment of a combined 2D and 3D method (300) is shown in FIG. 3. In the exemplary combined embodiment shown, the 2D method is carried out first and the 3D method second. In some embodiments, the 3D method is first; in some, they are carried out in parallel. The order is not important.

In the embodiment shown, one or more 2D images are input (305). The 2D images can be 2D camera images of an object in a volumetric video, camera images from which the volumetric video was generated, they can be 2D renderings of the volumetric model at a plurality of angles or any combination thereof. The plurality of angles need not be angles where input cameras existed.

A 2D network, as disclosed above, does material segmentation (310) for each 2D image and generates, as disclosed above, a material index for each visible patch of each object of interest in each 2D image.

The material indexes are assigned (315) to the output texel(s) that correspond to the patch(es) for each patch in each image. An output texel can have a one-to-none relationship with the input (the portion of the patch corresponding to the output texel is occluded in all images), it can have a one-to-one relationship with the input (the portion of the patch corresponding to the output texel is visible in only one image or all portions of the patch(es) corresponding to the output texel have identical material indexes) or it can have a one-to-many relationship with the index (the portions of the patch(es) corresponding to the output texel have different material indexes).

A model is provided (320), comprising at least a part of at least one object, the model comprising a cloud of points that define the object's surface, with each point in the cloud having a color.

A neural network that works on a colored cloud of points, as disclosed above, assigns a material index to each point (325), as disclosed above. The point cloud can be derived from 2D images or can be generated independently. The input to the neural network can be any subset of the cloud of points used to create the volumetric video, any subset of the triangle vertices (or other polygon vertices) that compose the volumetric video frame, any sampling of the volumetric video or any combination thereof.

The material indexes of the points are used to assign a material index (330) to each output texel. Any conventional method, such as, but not limited to, the decision algorithm method disclosed above, can be used to generate a single material index from the material indexes of the points within the output texel.

The plurality of material indexes derived from the 3D material index(es) and the 2D material index(es) are reduced to a single index (335), typically by means of a decision algorithm. Some non-limiting examples of a decision algorithm are a voting based algorithm, a decision tree based algorithm, or a deep learning classification based algorithm.

Note that the steps of assigning a material index from the points and assigning a material index from the plurality of patch indexes can be combined—the 3D point indexes and 2D patch indexes can be combined into a single patch index preferably, but not necessarily, in a single step.

For any area that is completely occluded (not visible in any of the input images), a material index can be determined (340) for texel(s) corresponding to that area (occluded texels) by using data from neighboring texels with similar colors, where a neighboring texel is within a predetermined distance or a predetermined number of texels of a boundary between visible and occluded texels. If neighboring texel(s) have similar but not identical colors, an index can be generated for the occluded texel(s) from the indexes of the neighboring texels by a decision algorithm, as disclosed above.

The determination of a material index for an occluded texel can be made at either the input texel stage or the output texel stage. More commonly, determination of material index for an occluded texel is done at the input texel stage.

In some cases one set of neighboring texels has a first color (a first set of similar colors) and another set of neighboring texels has a second color (a second set of similar colors), with the first color different from the second color. For non-limiting example, the first color could be in a pair of blue pants, while the second color could be the yellow in a shirt. In this case, an index can be generated for the occluded texel(s) from the indexes of the neighboring texels by a decision algorithm, as disclosed above, the decision algorithm configured (or trained) to determine a boundary between the two colors so that one color is applied to the texels on one side of the boundary and the other color is applied to texels on the other side of the boundary.

Multi-Frame Approaches

Any of the single frame algorithms (SFAs) disclosed above can be extended to multi-frame methods by several means.

1. Representative method:

An SFA, as disclosed in any of the above methods, is done on a representative of a group of frames and the result is associated with the corresponding texels in all members of the group.

In an exemplary embodiment (400), a representative set of frames is selected and a representative frame is selected (405) from the set of frames.

From the representative frame, at least one 2D image is provided (410). A 2D image can be a camera image from which the volumetric video was generated, it can be a 2D rendering of the volumetric model at some angle or any combination thereof. The angle need not be an angle where an input camera existed.

A 2D network that does material segmentation is applied (415) to each 2D image and a material index (or other identifier) is generated for each visible patch of each object of interest in each 2D image, where all patches with the same material index have the same set of properties with respect to light. Many types of 2D networks that do material segmentation and classification could be used. One such exemplary technique is Graphonomy. Other exemplary techniques include, but are not limited to, pulse-coupled neural networks (PCNNs), convolutional neural networks, long short-term memory (LSTM) models, and multi-task learning. Exemplary 2D network segmentation and classification packages include, but are not limited to, DeepLab and RefineNet. The essence of the invention is not limited by the 2D network used.

The material indexes are applied (420) for each patch in each image to the output texel(s) that correspond to the patch(es). An output texel can have a one-to-none relationship with the input (the portion of the patch corresponding to the output texel is occluded in all images), it can have a one-to-one relationship with the input (the portion of the patch corresponding to the output texel is visible in only one image or all portions of the patch(es) corresponding to the output texel have identical material indexes) or it can have a one-to-many relationship with the input (the portions of the patch(es) corresponding to the output texel have different material indexes).

For texels that have a one-to-many relationship with the input, the plurality of material indexes must be reduced to a single index (425), typically by means of a decision algorithm. Some non-limiting examples of types of decision algorithm are a voting based algorithm, a decision tree based algorithm, or a deep learning classification based algorithm.

For any area that is completely occluded (not visible in any of the input images), a material index can be determined (430) for texels corresponding to that area (occluded texels) by using data from neighboring texels with similar colors, where a neighboring texel is within a predetermined distance or a predetermined number of texels of a boundary between visible and occluded texels. If neighboring texel(s) have similar but not identical colors, an index can be generated for the occluded texel(s) from the indexes of the neighboring texels by a decision algorithm, as disclosed above.

The determination of a material index for an occluded texel can be made at either the input texel stage or the output texel stage. More commonly, determination of material index for an occluded texel is done at the input texel stage.

In some cases one set of neighboring texels has a first color (a first set of similar colors) and another set of neighboring texels has a second color (a second set of similar colors), with the first color different from the second color. For non-limiting example, the first color could be in a pair of blue pants, while the second color could be the yellow in a shirt. In this case, an index can be generated for the occluded texel(s) from the indexes of the neighboring texels by a decision algorithm, as disclosed above, the decision algorithm configured (or trained) to determine a boundary between the two colors so that one color is applied to the texels on one side of the boundary and the other color is applied to texels on the other side of the boundary.

For all other frames in the representative set of frames, provide a material index for each output texel (435), where the material index of the output texel in the other frames is the same as the material index of an associated texel in the representative frame.

2. Extended representative method:

An SFA, as disclosed in any of the above methods, can be done on a representative of a group of frames and the result can be associated with the corresponding texels in all of the group. For areas that are occluded in the representative frame, another SFA can be done for another representative frame selected from the group, one in which at least some of the areas occluded in the first representative frame are visible. It is clear that more than one other SFA can be done, on more than one other representative frame.

In an exemplary embodiment (500), a representative set of frames is selected and a representative frame is selected (505) from the set of frames.

From the representative frame, at least one 2D image is provided (510). A 2D image can be a camera image of an object in the volumetric video, a camera image from which a volumetric video was generated, a 2D rendering of the volumetric model at some angle or any combination thereof. The angle need not be an angle where an input camera existed.

A 2D network that does material segmentation is applied (515) to each 2D image and a material index (or other identifier) is generated for each visible patch of each object of interest in each 2D image, where all patches with the same material index have the same set of properties with respect to light. Many types of 2D networks that do material segmentation and classification could be used. One such exemplary technique is Graphonomy. Other exemplary techniques include, but are not limited to, pulse-coupled neural networks (PCNNs), convolutional neural networks, long short-term memory (LSTM) models, and multi-task learning. Exemplary 2D network segmentation and classification packages include, but are not limited to, DeepLab and RefineNet. The essence of the invention is not limited by the 2D network used.

The material indexes are applied (520) for each patch in each image to the output texel(s) that correspond to the patch(es). An output texel can have a one-to-none relationship with the input (the portion of the patch corresponding to the output texel is occluded in all images), it can have a one-to-one relationship with the input (the portion of the patch corresponding to the output texel is visible in only one image or all portions of the patch(es) corresponding to the output texel have identical material indexes) or it can have a one-to-many relationship with the input (the portions of the patch(es) corresponding to the output texel have different material indexes).

For texels that have a one-to-many relationship with the input, the plurality of material indexes must be reduced to a single index (525), typically by means of a decision algorithm. Some non-limiting examples of types of decision algorithm are a voting based algorithm, a decision tree based algorithm, or a deep learning classification based algorithm.

For occluded texels (texels associated with areas not visible in any of the input images) (530), another representative frame is selected from the representative set of frames and the above steps (505-525) are repeated to determine a material index.

For any texel not associated with a visible area in any of the representative set of frames, a material index can be determined from neighboring texels with similar colors, where a neighboring texel is within a predetermined distance or a predetermined number of texels of a boundary between visible and occluded texels. If neighboring texel(s) have similar but not identical colors, an index can be generated for the occluded texel(s) from the indexes of the neighboring texels by a decision algorithm, as disclosed above.

The determination of a material index for an occluded texel can be made at either the input texel stage or the output texel stage. More commonly, determination of material index for an occluded texel is done at the input texel stage.

In some cases one set of neighboring texels has a first color (a first set of similar colors) and another set of neighboring texels has a second color (a second set of similar colors), with the first color different from the second color. For non-limiting example, the first color could be in a pair of blue pants, while the second color could be the yellow in a shirt. In this case, an index can be generated for the occluded texel(s) from the indexes of the neighboring texels by a decision algorithm, as disclosed above, the decision algorithm configured (or trained) to determine a boundary between the two colors so that one color is applied to the texels on one side of the boundary and the other color is applied to texels on the other side of the boundary.

For all other frames in the representative set of frames, a material index for each output texel can be provided (535), where the material index of the output texel in the other frames is the same as the material index of an associated texel in the representative frame.

3. Decision algorithm method:

An SFA, as disclosed in any of the above methods, is done for all or for a subset of a group of frames and a decision algorithm is used, as disclosed above, on corresponding texels for the whole group of frames. This is a natural extension to the 2D decision algorithm mechanism disclosed above.

4. Every frame for itself method:

An SFA, as disclosed in any of the above methods, is done independently for each frame in the group, disregarding the fact that they are in a group.

Behavior Next to Borders

In digitized representations of objects, the border between two areas is seldom smooth. This can be the result of the digitization process; for non-limiting example, a diagonal line represented on a rectangular grid will appear as a series of steps, since the representation of the diagonal is forced to follow the lines of the grid. The non-smoothness can also be caused by, for non-limiting example, difficulty in determining the location of a border, imperfections in the process that determined the location of the border, errors in the determination of the location of a border, or a combination of these and possibly other factors.

Note that, although the existence of non-smoothness is germane to the patent, its cause is not germane to the patent.

Smoothing of the border can improve the quality of the volumetric video. Because of limitations in computing power, it can be undesirable to smooth all borders However, it is well-known in the art that smoothing of some types of border improves the appearance of the displayed object much more than smoothing of other types of border. For non-limiting example, smoothing a border between an eye and the surrounding skin or a mouth and the surrounding skin is much more effective in improving the appearance of the person than improving the smoothness of the border between the person's skin and the shirt the person is wearing. Another non-limiting example, is that improving the border around an eye is much more effective than improving the border between a shirt and a pair of pants.

Non-limiting examples of methods that can be used to smooth a border are:

a. Encoding a material index for each output texel in the same way as is used for all other output texels. In this case, any smoothing will be done in the shader. In addition to attaching the lighting properties to the texel, the shader will need to determine the spatial surrounding of the border and adjust the lighting properties. This is not practicable.

b. Smoothing the lighting properties and then encoding the smoothed lighting properties. This is undesirable since it requires much more storage space than encoding only the material index.

c. Encoding "border materials" that have lighting properties that are a blend of the material properties on either side of the border. This is cumbersome and increases both the amount of storage space required and the time needed to generate the volumetric video, since the lighting properties of the border materials will have to be generated and stored, with the generation and storage needing to be done individually for each border of interest.

d. Encoding pairs of material indexes. In the renderer or the shader, a ratio between the material indexes can be determined, to indicate the weight applied to the properties with respect to light of each output texel.

How the ratio is determined and how it is applied in the renderer or shader is not germane to the patent.

An output texel can be classified as a border texel if a neighboring output texel has a different material index. In some embodiments, a texel is defined as a border texel if it is within N output texels of an output texel of a different material index. N can be in a range from 1 to 100; in a range from 1 to 20, in a range from 1 to 10, or it in a range from 1 to 3.

In some embodiments, an output texel can be defined as a border texel if it is within a predetermined distance of an output texel of a different material index. The predetermined distance can be fixed, it can be related to the size of the feature(s) of interest, or it can be related to the size of the object of which the output texel is a component.

Assigning "Light Properties"

Assigning the light properties for each material index can be done manually, semi-automatically or automatically. Since the number of items that need to be assigned a property has been reduced from the number of texels to the number of indexes, a manual approach is feasible. In a manual approach, for each material index, a patch comprising the material index is examined visually and texture properties are assigned based on the visual inspection. In some embodiments of an automatic approach, a neural network is used to determine the texture properties.

A semi-automatic approach combines a manual inspection and a neural network approach. For non-limiting example, a manual inspection can subdivide the material indexes into types and then the neural network can classify subtypes of the types. The manual inspection could, for non-limiting example, subdivide the material indexes into types such as, but not limited to, skin, cloth and metal, with the neural network then automatically determining the subtype, such as, but not limited to, the type of skin (young, old, head, hand, etc.), the type of cloth (smooth, rough, velvet, comprising metallic fibers, etc.) and the shininess of the metal. In another semi-automatic approach, the neural network determines the texture properties, which are then verified and, if necessary, corrected, during a manual inspection.

In some embodiments, areas that are on the border of two indexes use interpolation methods such as weighted average for the properties that are assigned to the two indexes. The weights can be the distance from the borders—this interpolation smooths the transition from one material to the other and helps overcome inaccuracies in the index assignment per texel. The distance from a border can be a measured distance, a number of texels or any combination thereof.

In some embodiments, only indexes from a subset of indexes are interpolated.

In some embodiments, lighting properties are represented by a 2-dimensional vector (metalness and roughness).

In some embodiments, the material indexes are part of the volumetric video (or accompany it) and lighting properties are assigned to the texels in the rendering engine, the shader or any combination thereof. In other embodiments, the lighting properties are part of the volumetric video (or accompany it) and the graphics engine, the shader or any combination thereof only render the image(s) according to the stored lighting properties.

Encoding the Data in a File

There are many ways the data can be stored. It can be encoded in the same file as the atlas or in a separate file.

Depending on the multiframe method, as described above, it can be stored per frame or per group of frames.

Rendering the Result According to Light Properties

The rendering engine uses the lighting properties of the texel with the color of the texel and the normal assigned to that texel surface to render the texel into the 2D image(s) that are displayed.

Example 1

Figure 6:
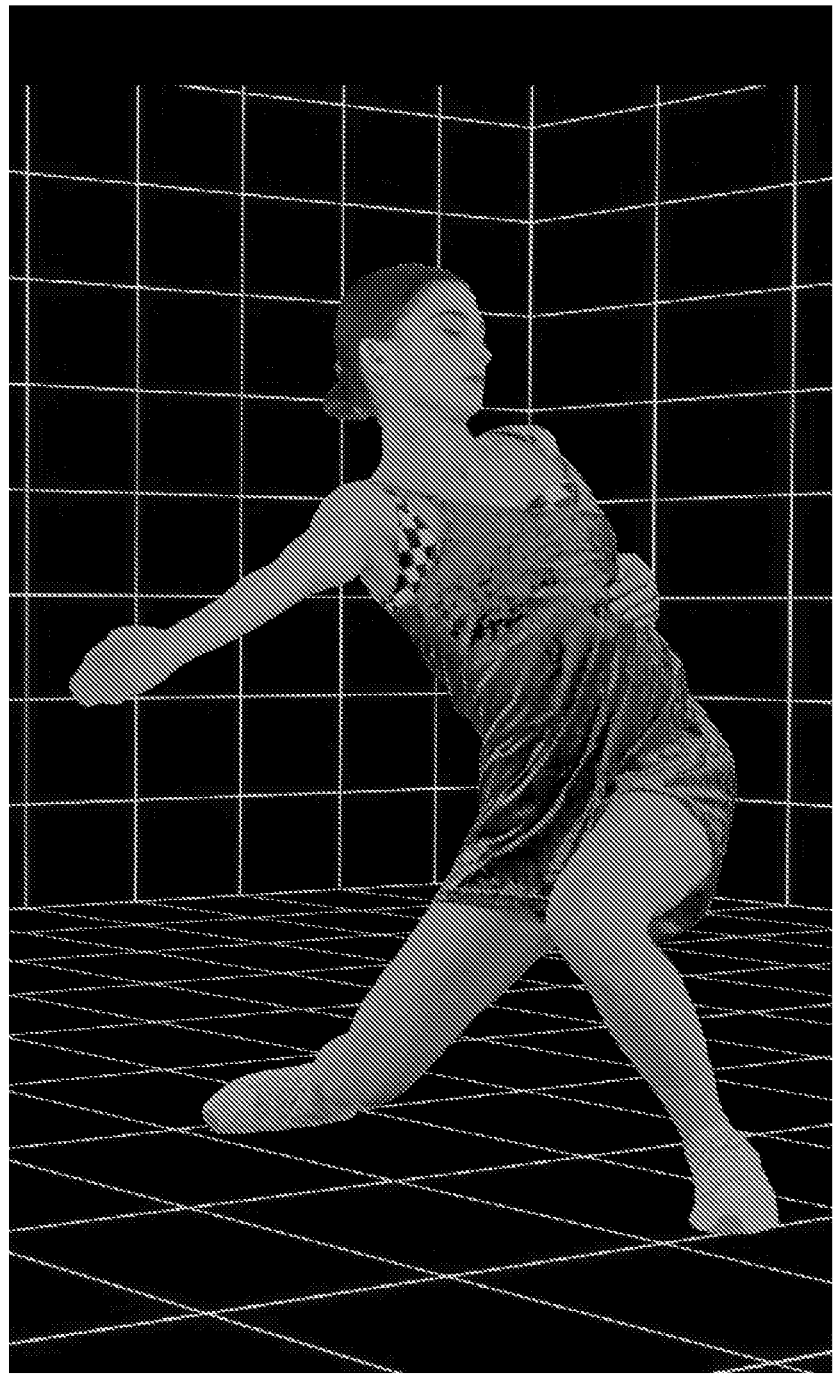
FIG. 6 depicts an exemplary image of a dancer on a neutral grid background with the skin and clothing showing only reflections resulting from the lighting used to generate the original images.
Figure 7:
FIG. 7 depicts an exemplary image of a dancer embedded in a virtual reality environment, where the (green) highlights from from the green light sources in the virtual reality environment have not been added; the highlights are only those from the lighting used in generating the original volumetric video.
Figure 8A:
FIGS. 8A-C depict exemplary images of a dancer embedded in a virtual reality environment, showing (green) highlights on her clothing and her skin from light sources in the virtual reality environment.
Figure 8B:
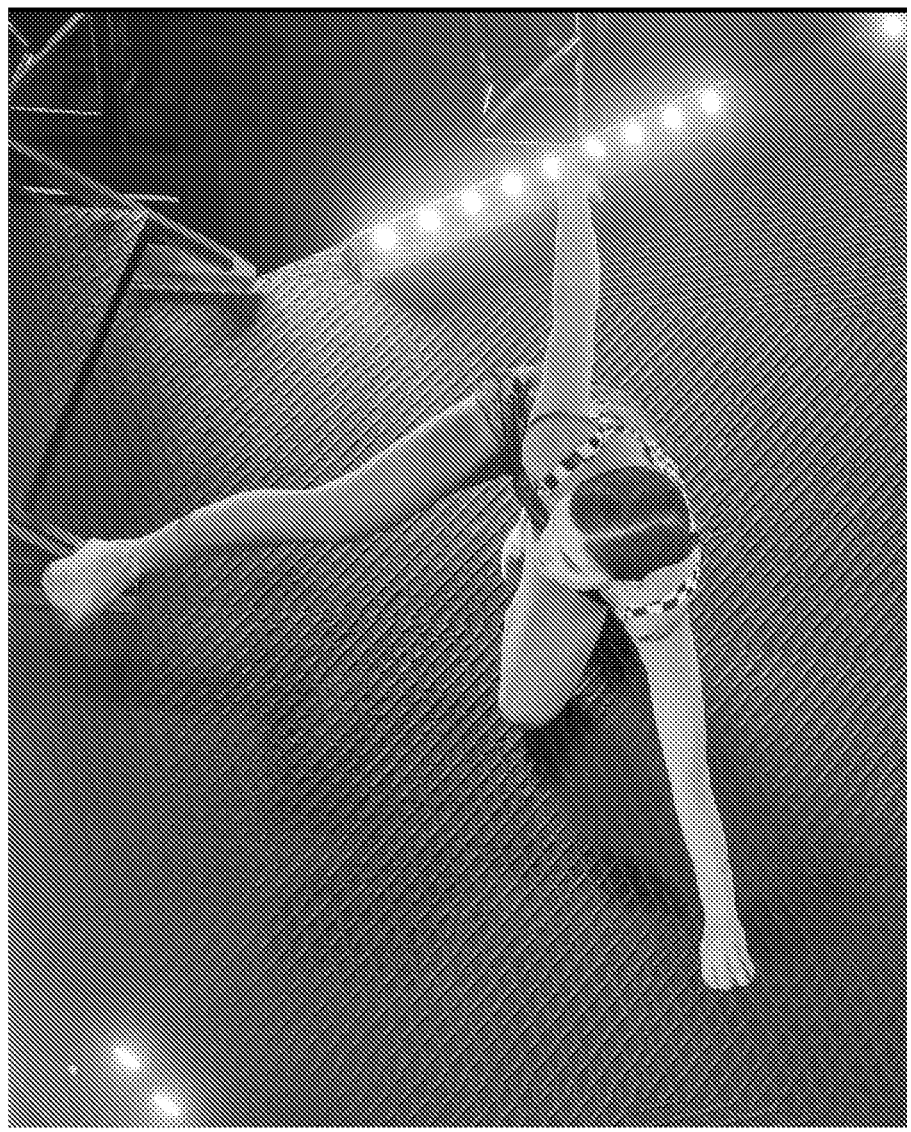
Figure 8C:

FIGS. 6-8 illustrate exemplary rendered views of the process of illuminating an object, here a dancer. In this example, the dancer was imaged by one or more cameras. In FIG. 6, the dancer has been isolated from the original background and is shown against an exemplary grid. In FIG. 7, the dancer has been embedded in a disco scene; green lights are seen in the background, aimed in the general direction of the dancer but no greenness from the light is seen on the dancer's skin or dress although greenness can be seen in the floor at her feet; the greenness of the floor being generated by the software generating the disco scene. In FIGS. 8A-C, the dancer is seen in three different poses. The green light reflected from her clothing and her skin can be clearly seen. In FIG. 8A, the greenness is seen on her exposed back, the back of her garment, the side of her left arm closer to the lights and, slightly, in the shadow at the back of her knee.

In FIG. 8B, greenness is seen on her face, on the front sides of both arms, and on the sides of her thighs closer to the lights. Greenness can also be seen on the straps of her garment and the waist and thighs of the garment, on the side closer to the lights.

In FIG. 8C, greenness is seen on her back and on the back of her garment, especially on the sides of the folds of the garment closer to the lights. Her arms and legs are out of the path of the lights, so no greenness is seen on them.

In FIGS. 6-8, it can be seen that the dress, which appears to contain highly-reflective fibers, reflects light differently from the skin.

The invention claimed is:

1. A method for generating metadata to accompany a volumetric video for at least one output texel of at least one object in at least one frame of the volumetric video, comprising steps of:
   inputting at least one representation of at least a portion of said at least one object, wherein said at least one representation is selected from a group consisting of a 2D image from an imaging device, a 2D image from a rendered frame of the volumetric video, a patch, a point cloud that helped build the volumetric video, a point cloud that is a sampling of the volumetric video, a portion of a mesh, or any combination thereof;
   identifying, in said at least one representation, at least one matching material area, each of said at least one matching material area comprising at least one input texel, each of said at least one input texel having one or more properties with respect to light, all of said at least one matching material area having identical one or more properties with respect to light;
   generating at least one input material group, all of said at least one input texel in each of said at least one input material group having said identical one or more properties with respect to light; each of said at least one input material group comprising all of said at least one input texel from all of said at least one matching material area;
   for at least one of said at least one input material group there exists a correspondence with an output material group, each of said output material group comprising at least one of said at least one output texel;
   for said at least one frame being a plurality of frames, selecting a subset of a group of frames;
   determining, for each of said at least one frame of said subset of said group of frames, a set of material group descriptors; and, for each of said at least one output texel, determining a single material group descriptor by means of a decision algorithm; and selecting said decision algorithm from a group consisting of a voting based algorithm, a decision tree based algorithm, or a deep learning classification based algorithm;
   determining a relationship between said at least one output texel and said material group descriptor in each of said plurality of frames, said relationship selected from a group consisting of one-to-none, one-to-one and one-to-many; and
   for the relationship between said at least one output texel and said material group descriptor in each of said plurality of frames being one-to-many, reducing a plurality of said material group descriptors to said single material group descriptor for said at least one output texel;
   said reducing of said plurality of said material group descriptors to said single material group descriptor being by means of said decision algorithm; and selecting said decision algorithm from a group consisting of a voting based algorithm, a decision tree based algorithm, or a deep learning classification based algorithm;
   wherein all of said at least one output texel in each of said output material group has said identical one or more properties with respect to light;
   wherein said metadata is associated with said one or more properties with respect to light;
   wherein said metadata is configured so that light is reflectable from any surface in said volumetric video in a realistic manner, thereby enabling the volumetric video to be rendered with respect to light properties of a scene of the volumetic video and increasing perceived quality of the volumetric video.

2. The method of claim 1, additionally comprising at least one of the following steps:
   a. assigning to each of said at least one output material group a selected material group descriptor selected from a group consisting of a material index, said one or more properties with respect to light or any combination thereof; and encoding said selected material group descriptor in a member of a group consisting of an atlas, a file or any combination thereof;
   b. rendering said at least one output texel of said at least one object in said at least one frame of said volumetric video, said rendering comprising rendering of light, said rendering of light dependent on said one or more properties with respect to light of said at least one output texel of said at least one object in said at least one frame of said volumetric video; and selecting said one or more properties with respect to light from a group consisting of a color, a roughness, a metalness, normal direction, texture, or any combination thereof;
c. for said at least one frame being a plurality of frames, selecting a representative frame from said plurality of frames, and encoding said selected material group descriptor once for said plurality of frames; and
d. for said at least one frame being said plurality of frames, determining said selected material group descriptor for each of said at least one output texel in each of said plurality of frames, said determining being executed independently for each of said at least one frame in said plurality of frames.

3. The method of claim 1, for each of a one-to-none output texel, where said one-to-none output texel does not have a relationship with any of said material group descriptors, additionally comprising at least one of the following steps:
a. selecting at least one second representative frame from said plurality of frames and determining, from said at least one second representative frame, said material group descriptor for at least one of said one-to-none output texel;
b. determining said material group descriptor for said one-to-none output texel by using metadata from at least one neighboring output texel; and
c. selecting said at least one second representative frame from said plurality of frames and determining, from said at least one second representative frame, said material group descriptor for at least one of said one-to-none output texel and determining said material group descriptor for at least one of said one-to-none texel by using metadata from at least one neighboring output texel.

4. The method of claim 3, additionally comprising a step of, for each of said one-to-none texel having a plurality of said material group descriptors, reducing said plurality of said material group descriptors to said single material group descriptor; said reducing of said plurality of said material group descriptors to said single material group descriptor being by means of said decision algorithm; and selecting said decision algorithm from a group consisting of a voting based algorithm, a decision tree based algorithm, or a deep learning classification based algorithm.

5. The method of claim 1, additionally comprising a step of, for an occluded texel, an occluded texel being one of said at least one output texel associated with none of said material group descriptor, determining an occluded material group descriptor for said occluded texel by using metadata from at least one neighboring output texel.

6. The method of claim 5, additionally comprising a step of, for said occluded texel being associated with a plurality of said material group descriptor, reducing said plurality of said material group descriptors to said single material group descriptor; said reducing of said plurality of said material group descriptors to said single material group descriptor being by means of said decision algorithm, and of selecting said decision algorithm from a group consisting of a voting based algorithm, a decision tree based algorithm, or a deep learning classification based algorithm.

7. The method of claim 1, additionally comprising a step of determining a first output texel to be a border texel, said first output texel having a first material group descriptor and a second output texel having a second material group descriptor; said first material group descriptor being different from said second material group descriptor, and said first output texel being within a predetermined range of said second output texel; and
encoding, for each of said border texel, said first material group descriptor and said second material group descriptor.

8. A non-transitory computer-readable medium comprising computer-executable instructions which, when executed by a computing device, cause the computing device to carry out a method for generating metadata to accompany a volumetric video for at least one output texel of at least one object in at least one frame of a volumetric video, the method comprising steps of:
inputting at least one representation of at least a portion of said at least one object, wherein said at least one representation is selected from a group consisting of a 2D image from an imaging device, a 2D image from a rendered frame of a volumetric video, a patch, a point cloud that helped build a volumetric video, a point cloud that is a sampling of a volumetric video, a portion of a mesh, or any combination thereof;
identifying, in said at least one representation, at least one matching material area, each of said at least one matching material area comprising at least one input texel, each of said at least one input texel having one or more properties with respect to light, all of said at least one matching material area having identical one or more properties with respect to light;
generating at least one input material group, all of said at least one input texel in each of said at least one input material group having said identical one or more properties with respect to light; each of said at least one input material group comprising all of said at least one input texel from all of said at least one matching material area;
for at least one of said at least one input material group there exists a correspondence with an output material group, each of said output material group comprising at least one of said at least one output texel;
for said at least one frame being a plurality of frames, selecting a subset of a group of frames; determining, for each of said at least one frame of said subset of said group of frames, a set of material group descriptors; and, for each of said at least one output texel, determining a single material group descriptor by means of a decision algorithm; and selecting said decision algorithm from a group consisting of a voting based algorithm, a decision tree based algorithm, or a deep learning classification based algorithm;
determining a relationship between said at least one output texel and said material group descriptor in each of said plurality of frames, said relationship selected from a group consisting of one-to-none, one-to-one and one-to-many; and
for the relationship between said at least one output texel and said material group descriptor in each of said plurality of frames being one-to-many, reducing a plurality of said material group descriptors to said single material group descriptor for said at least one output texel; said reducing of said plurality of said material group descriptors to said single material group descriptor being by means of said decision algorithm; and selecting said decision algorithm from a group consisting of a voting based algorithm, a decision tree based algorithm, or a deep learning classification based algorithm;

wherein all of said at least one output texel in each of said output material group has said identical one or more properties with respect to light;

wherein said metadata is associated with said one or more properties with respect to light;

wherein said metadata is configured so that light is reflectable from any surface in said volumetric video in a realistic manner, thereby enabling the volumetric video to be rendered with respect to the light properties of the scene and increasing perceived quality of the volumetric video.

9. The non-transitory computer-readable medium of claim 8, wherein the computer-executable instructions are additionally configured, when executed, to perform at least one of the following steps:
   a. assigning to each of said at least one output material group a material group descriptor selected from a group consisting of a material index, said one or more properties with respect to light or any combination thereof; said material group descriptor being encoded in a member of a group consisting of an atlas, a file or any combination thereof;
   b. rendering said at least one output texel of said at least one object in said at least one frame of a volumetric video, said rendering comprising rendering of light, said rendering of light dependent on said one or more properties with respect to light of said at least one output texel of said at least one object in said at least one frame of a volumetric video; said one or more properties with respect to light being selected from a group consisting of a color, a roughness, a metalness, normal direction, texture, or any combination thereof;
   c. for said at least one frame being a plurality of frames, selecting a representative frame from said plurality of frames; said material group descriptor is encoded once for said plurality of frames; or
   d. for said at least one frame being said plurality of frames, determining said material group descriptor for each of said at least one output texel in each of said plurality of frames, the determination being executed independently for each of said at least one frame in said plurality of frames.

10. The non-transitory computer-readable medium of claim 8, wherein the computer-executable instructions are additionally configured, when executed, for each of a one-to-none output texel, said one-to-none output texel does not have a relationship with any of said material group descriptor, to perform at least one of the following steps:
   a. selecting at least one second representative frame from said plurality of frames and determining, from said at least one second representative frame, said material group descriptor for at least one of said one-to-none output texel;
   b. determining said material group descriptor for at least one of said one-to-none output texel by using metadata from at least one neighboring output texel; or
   c. selecting said at least one second representative frame from said plurality of frames and determining, from said at least one second representative frame, said material group descriptor for at least one of said one-to-none output texel and determining said material group descriptor for at least one of said one-to-none texel by using metadata from at least one neighboring output texel.

11. The non-transitory computer-readable medium of claim 10, wherein the computer-executable instructions are additionally configured, when executed, to perform a step of for each of said one-to-none texel having a plurality of material descriptors, reducing said plurality of material descriptors to said single material group descriptor; said plurality of said material group descriptors being reduced to said single material group descriptor by means of said decision algorithm, said decision algorithm being selected from a group consisting of a voting based algorithm, a decision tree based algorithm, or a deep learning classification based algorithm.

12. The non-transitory computer-readable medium of claim 8, wherein the computer-executable instructions are additionally configured, when executed, to perform a step of, for an occluded texel, said occluded texel being one of said at least one output texel associated with none of said material group descriptor, determining an occluded material group descriptor for said occluded texel by using metadata from at least one neighboring output texel.

13. The non-transitory computer-readable medium of claim 12, wherein the computer-executable instructions are additionally configured, when executed, to perform a step for said occluded texel being associated with a plurality of said material group descriptor, reducing said plurality of said material group descriptor to said single material group descriptor by means of said decision algorithm, said decision algorithm being selected from a group consisting of a voting based algorithm, a decision tree based algorithm, or a deep learning classification based algorithm.

14. The non-transitory computer-readable medium of claim 8, wherein the computer-executable instructions are additionally configured, when executed, to perform a step of determining a first output texel to be a border texel, said first output texel having a first material group descriptor and a second output texel having a second material group descriptor, said first material group descriptor being different from said second material group descriptor, and said first output texel being within a predetermined range of said second output texel; for each of said border texel, said first material group descriptor and said second material group descriptor are encoded.

* * * * *